United States Patent
McManus et al.

(10) Patent No.: US 6,176,045 B1
(45) Date of Patent: *Jan. 23, 2001

(54) RETRACTABLE ROOM SUPPORT MECHANISM

(76) Inventors: Patrick W. McManus, 11891 Vistula Rd., Osceola, IN (US) 46561; James E. Dewald, Jr., 517 N. Benton, Mishawka, IN (US) 46514; Martin P. McManus, 1421 Hampshire Dr., South Bend, IN (US) 46614

( * ) Notice: Under 35 U.S.C. 154(b), the term of this patent shall be extended for 0 days.

This patent is subject to a terminal disclaimer.

(21) Appl. No.: 09/292,699

(22) Filed: Apr. 15, 1999

Related U.S. Application Data

(63) Continuation-in-part of application No. 09/186,171, filed on Nov. 4, 1998, which is a continuation-in-part of application No. 08/957,721, filed on Oct. 24, 1997, now abandoned.
(60) Provisional application No. 60/075,833, filed on Feb. 24, 1998.

(51) Int. Cl.$^7$ .................................................. B60P 3/34
(52) U.S. Cl. .................. 52/67; 52/64; 52/79.5; 52/79.8; 296/26.09; 296/26.13
(58) Field of Search .................... 52/79.5, 79.8, 52/67, 64; 296/26.03, 26.08, 26.09, 26.13, 26.12

(56) References Cited

U.S. PATENT DOCUMENTS

| | | |
|---|---|---|
| 3,046,047 | 7/1962 | Ferrera . |
| 3,106,750 | 10/1963 | Jarman et al. . |
| 4,930,837 | 6/1990 | Marsh et al. . |
| 5,090,749 | 2/1992 | Lee . |
| 5,398,986 | 3/1995 | Koob . |
| 5,491,933 | 2/1996 | Miller et al. . |
| 5,577,351 | 11/1996 | Dewald, Jr. et al. . |
| 5,586,802 | 12/1996 | Dewald, Jr. et al. . |
| 5,706,612 | 1/1998 | Tillet . |
| 5,787,650 * | 8/1998 | Miller et al. ............................. 52/67 |
| 5,788,306 * | 8/1998 | DiBiagio et al. ............. 296/26.13 X |
| 5,791,715 | 8/1998 | Nebel . |
| 5,833,296 * | 11/1998 | Schneider ........................ 296/26.13 |
| 5,857,733 | 1/1999 | Dewald, Jr. et al. . |
| 5,902,001 * | 5/1999 | Schneider ...................... 296/26.12 X |

FOREIGN PATENT DOCUMENTS 1 470 553  3/1966  (FR) .

* cited by examiner

Primary Examiner—Beth A. Stephan
Assistant Examiner—Brian E. Glessner
(74) Attorney, Agent, or Firm—Baker & Daniels

(57) ABSTRACT

Transportable living quarters includes a main frame supporting a main living area and a slide out room which slides between an extended and retracted position relative to the main living area. An extendable member is mounted on the main frame and is rigidly connected to the slide out room floor, so that the weight of the slide out room is transferred from the floor of the main living to the extendable member as the slide out room slides between the retracted and extended positions. In one embodiment of the invention, the floor of the slide out room is leveled with respect to the floor of the main living area when the slide out room is moved to the extended position by bending of the extendable support member in response to the weight transfer. According to the second embodiment of the invention, the weight transfer of the slide out room from the floor of the main living area to the extendable member causes the inner tubular member to deflect relative to the outer tubular member through the clearance provided between the members. Accordingly to still another embodiment of the invention, the extendible member is mounted on the main frame at an oblique angle with respect to horizontal. This angle is chosen to permit the slide out room floor to drop to a position flush with the main floor when the slide out room is in the extended position.

31 Claims, 15 Drawing Sheets

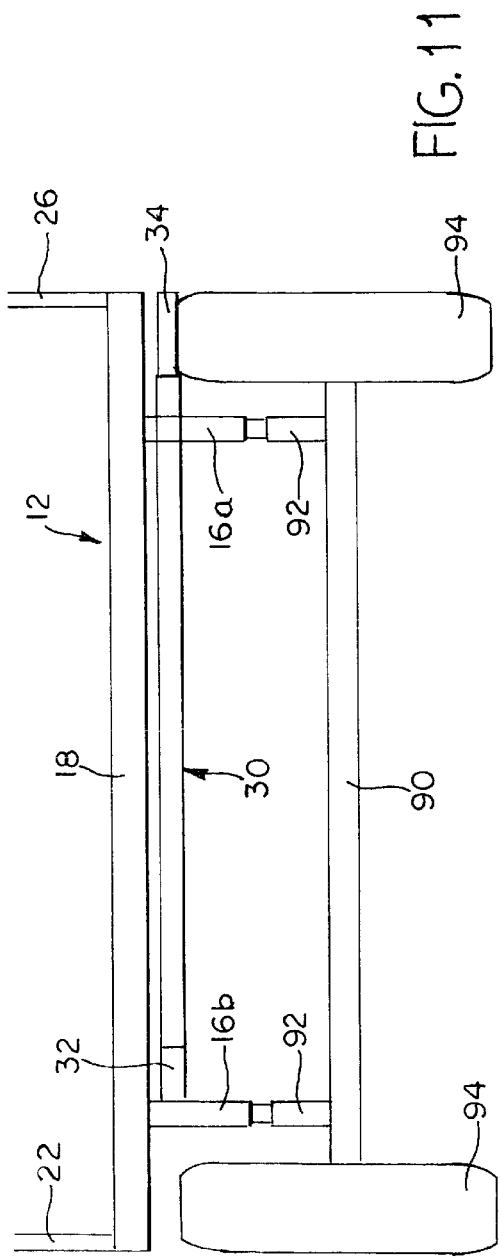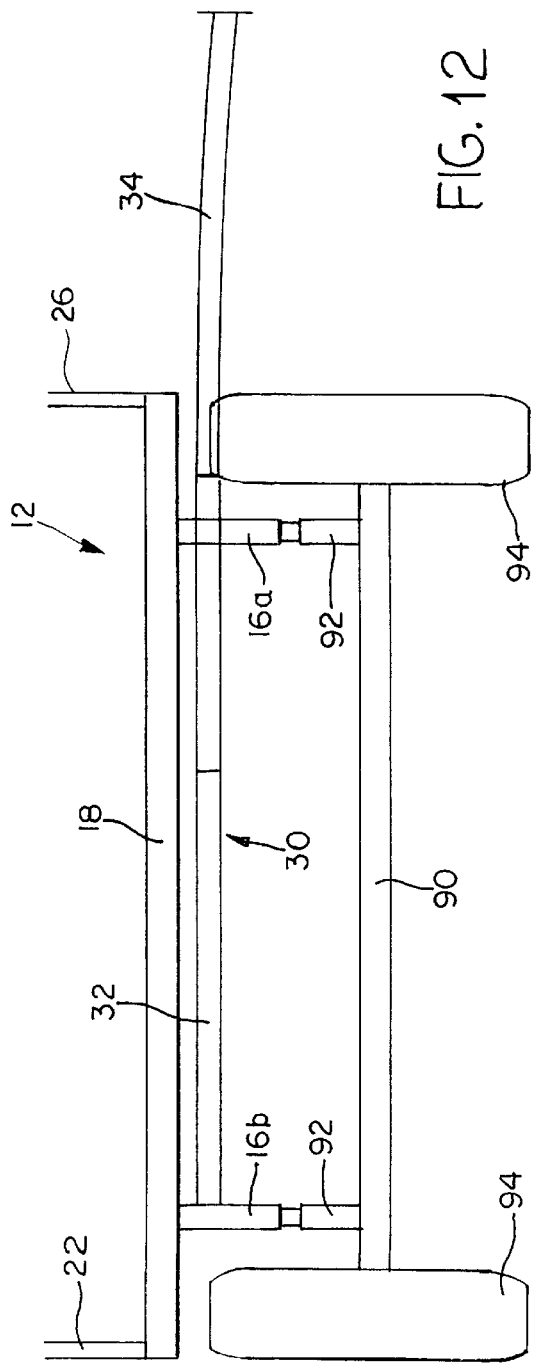

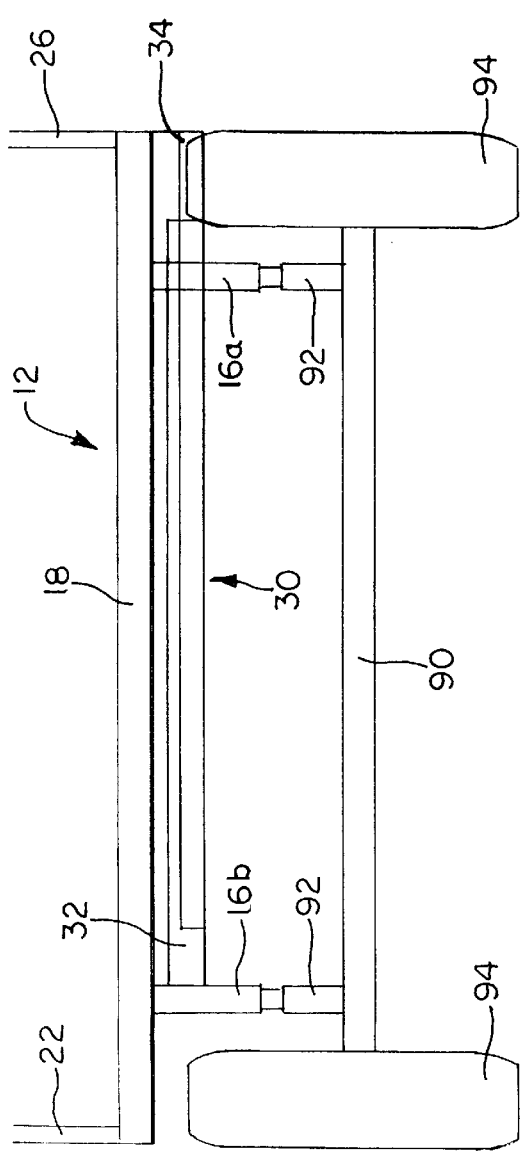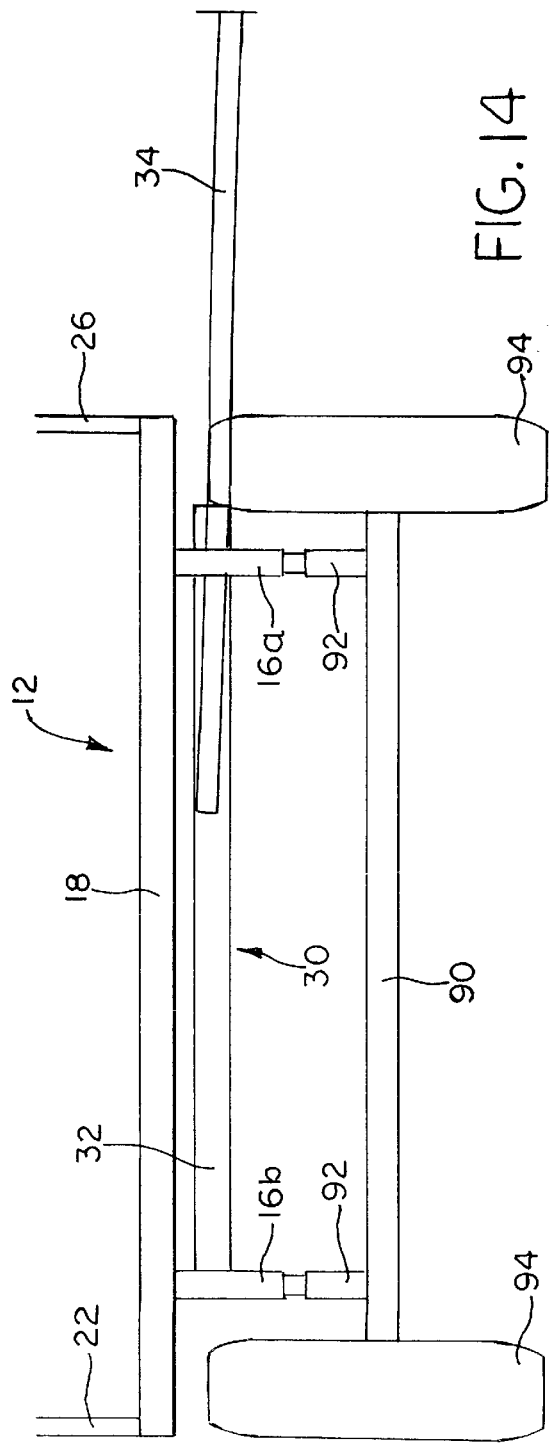

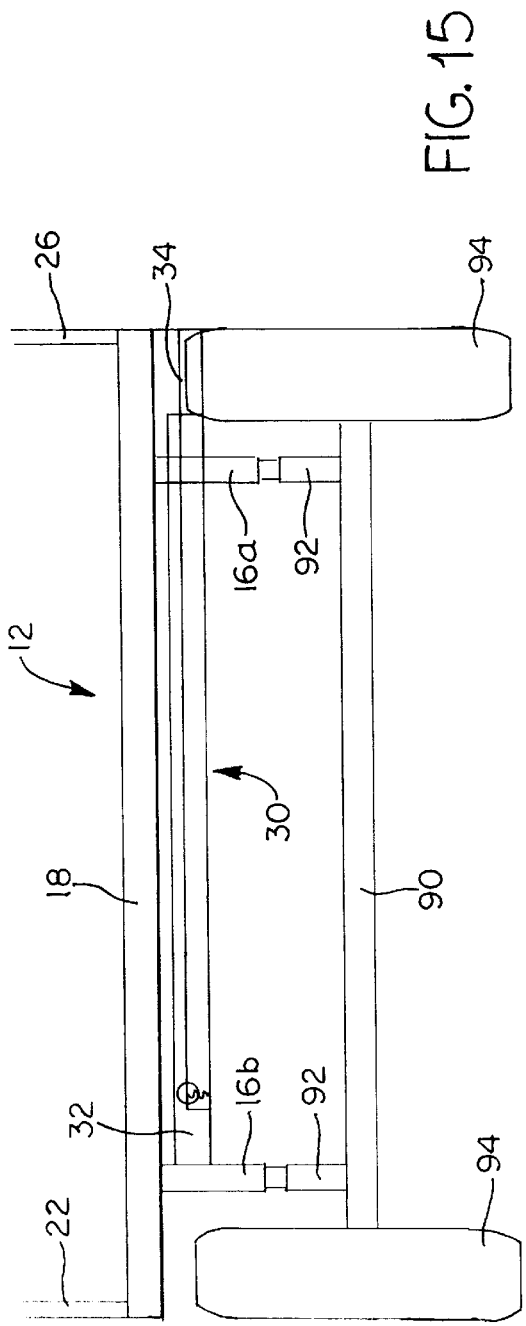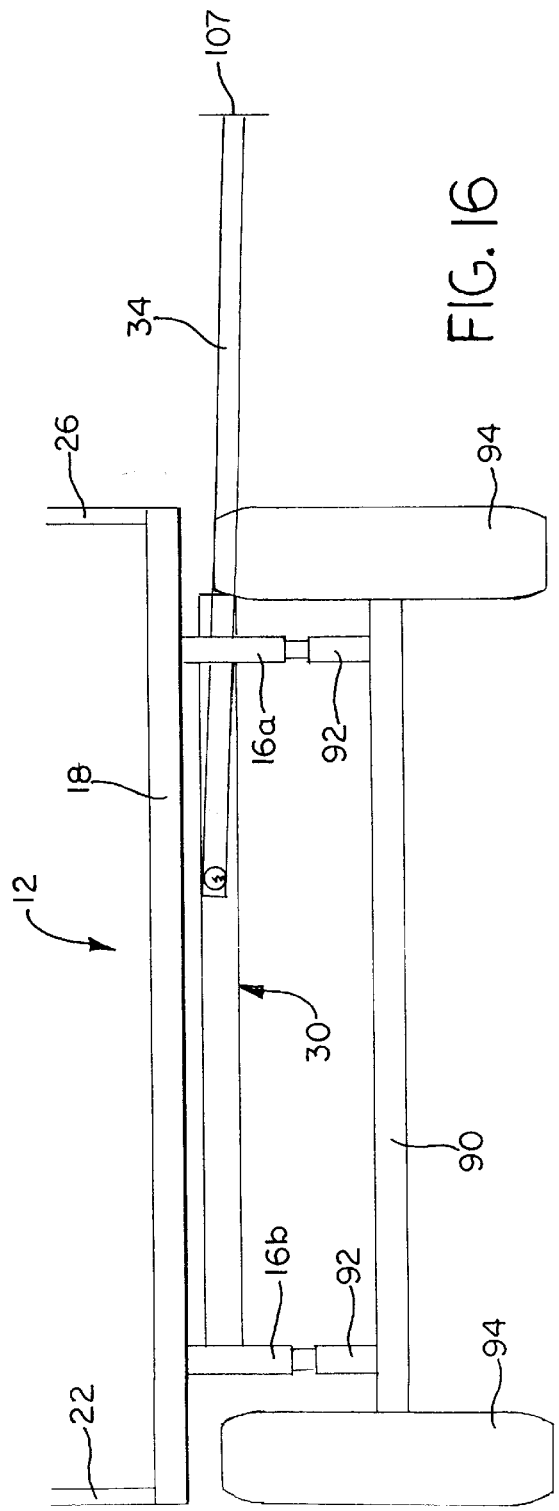

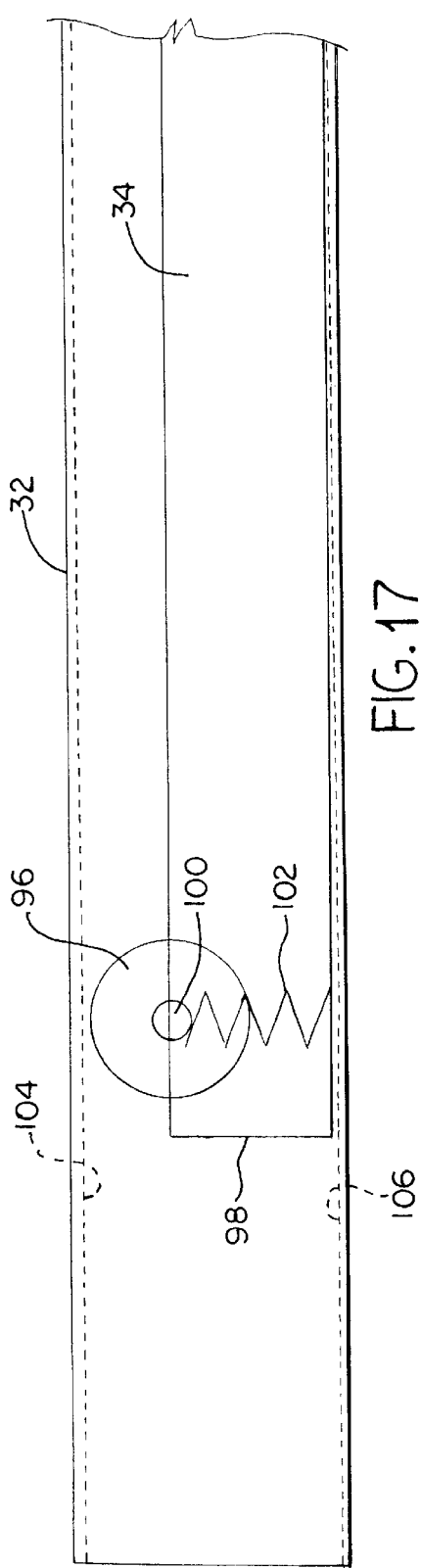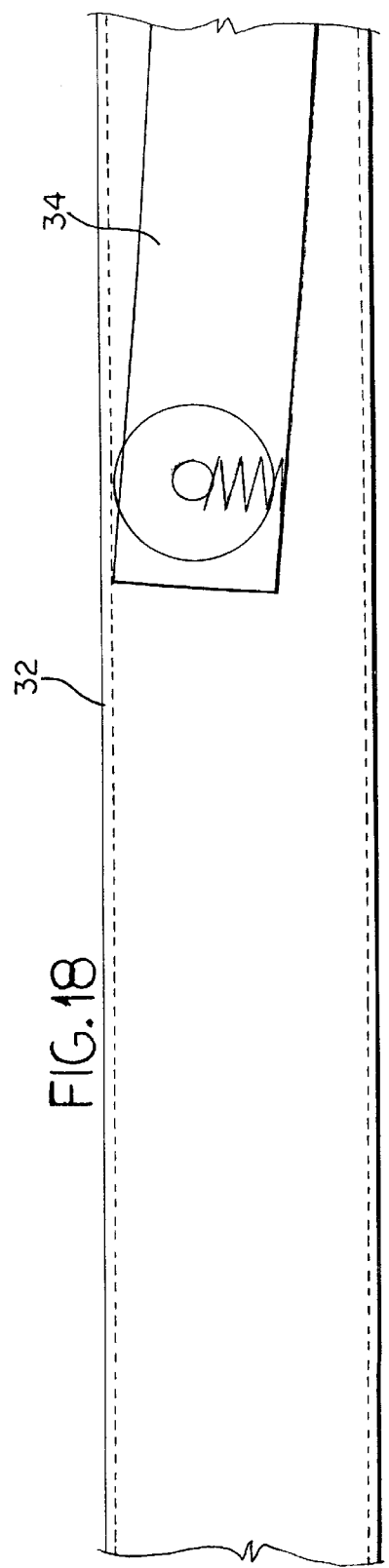

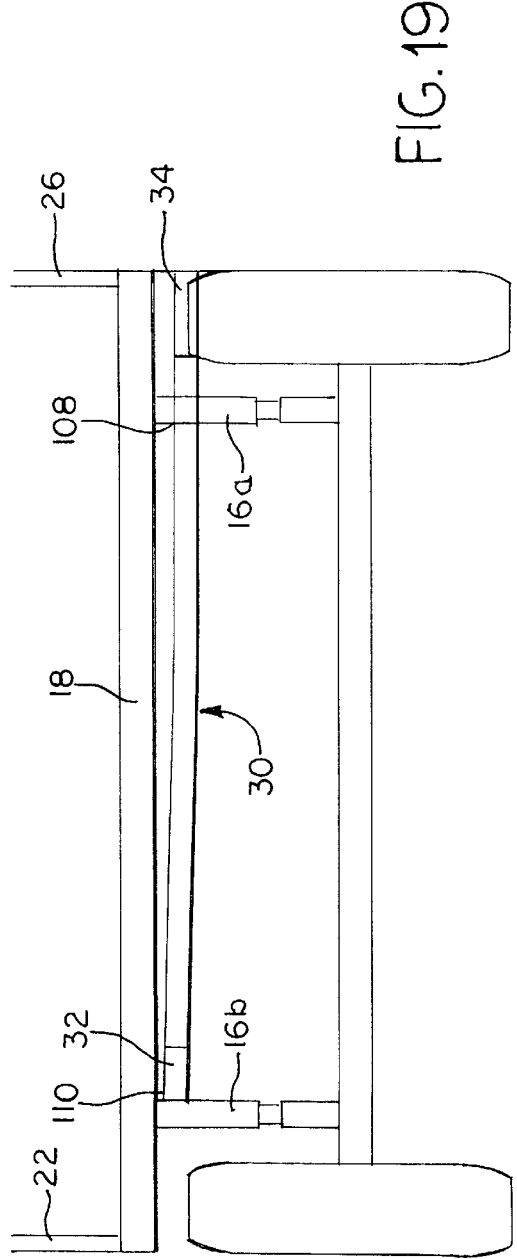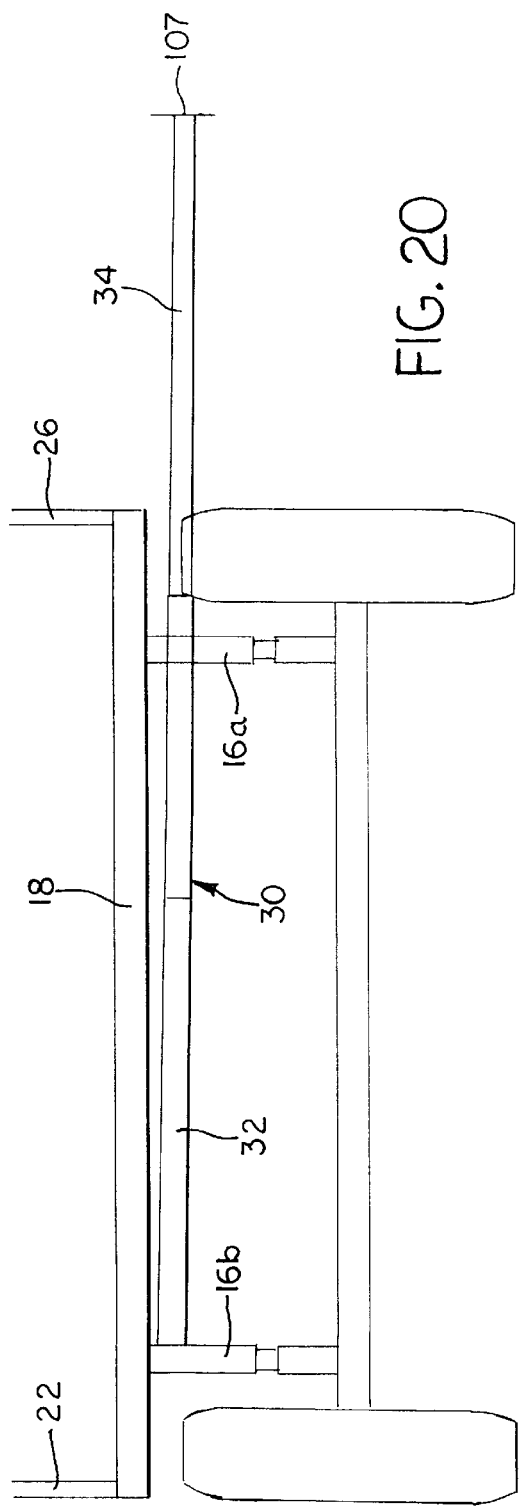

RETRACTABLE ROOM SUPPORT MECHANISM

This application is a continuation-in-part of U.S. patent application Ser. No. 09/186,171, filed Nov. 4, 1998, which is a continuation-in-part of U.S. patent application Ser. No. 08/957,721, filed Oct. 24, 1997, now abandoned, and also claims priority based upon U.S. Provisional Patent Application Serial No. 60/075,833, filed Feb. 24, 1998.

This invention relates to recreational vehicle or manufactured housing unit having a retractable room in which the floor of the retractable room moves to a position flush with the floor of the main living area when the retractable room is extended.

The widths of recreational vehicles and manufactured housing units are limited to that which may be accommodated for travel on public roads. Accordingly, it is increasingly common to provide recreational vehicles and manufactured housing units with a slide out room that can be retracted into the main living quarters when the unit is being moved or driven, but which can be extended from the main living quarters to provide auxiliary living space when the unit is parked for use or when the manufactured home is assembled at the home site. When the room is retracted into the main living quarters, the floor of the retractable room slides over the floor of the main living quarters and hence the level of the retractable room floor must be offset from the main floor when the retractable room is retracted. When the retractable room is extended to provide additional living space, most users find the difference in floor levels between the main living quarters and the extended room to be unsatisfactory, and thus it is desirable to provide a mechanism for bringing the floor of the slide out room flush with the floor in the main living quarters when the slide out room is extended. Such mechanisms known in the prior art require relatively complicated mechanisms and are relatively costly.

According to one embodiment of the present invention, bending of the extendible members which support the slide out room is designed to correspond to movement of the room such that in the fully extended position the extendible member connected to the slide out room deflects just enough to permit the floor of the slide out room to be flush with the floor of the main living quarters. Accordingly, the extendible member may be rigidly connected to the slide out room, eliminating the complicated prior art movable linkages. Optionally, an adjustment mechanism adjusts the angle of the extendible members so that the floor of the slide out room is level with the floor of the main living quarters when the slide out room is fully extended. According to another embodiment of the invention, the extendible members are mounted on a pivot mechanism which is adjustable to adjust the angle of extension of the members so that the floor of the slide out room is flush with the floor of the main living quarters. Accordingly, the slide out room drops into a position which is flush with the floor of the main living quarters as the slide out room is moved into the extended position. According to the other embodiments of the invention, the extendible members are mounted at a fixed angle, the angle being chosen to allow the floor of the slide out room to move into a position flush with the main floor, and/or the inner member is designed to move through a clearance with the outer member as the slide out room moves into the fully extended position. The actuation mechanism requires only a few additional components than prior art mechanisms which maintain a difference in levels between the floors of the main living quarters and the floor of the slide out room.

These and other advantages of the present invention will become apparent from the following description, with reference to the accompanying drawings, in which:

FIGS. 11 and 12 are views, partly in section, of the lower portion of the recreational vehicle illustrating an alternate embodiment of the invention;

FIGS. 13 and 14 are views similar to FIGS. 11 and 12, but illustrating still another alternate embodiment of the present invention;

FIGS. 15 and 16 are views similar to FIGS. 11 and 12, but illustrating still another embodiment of the present invention;

Figure 1:
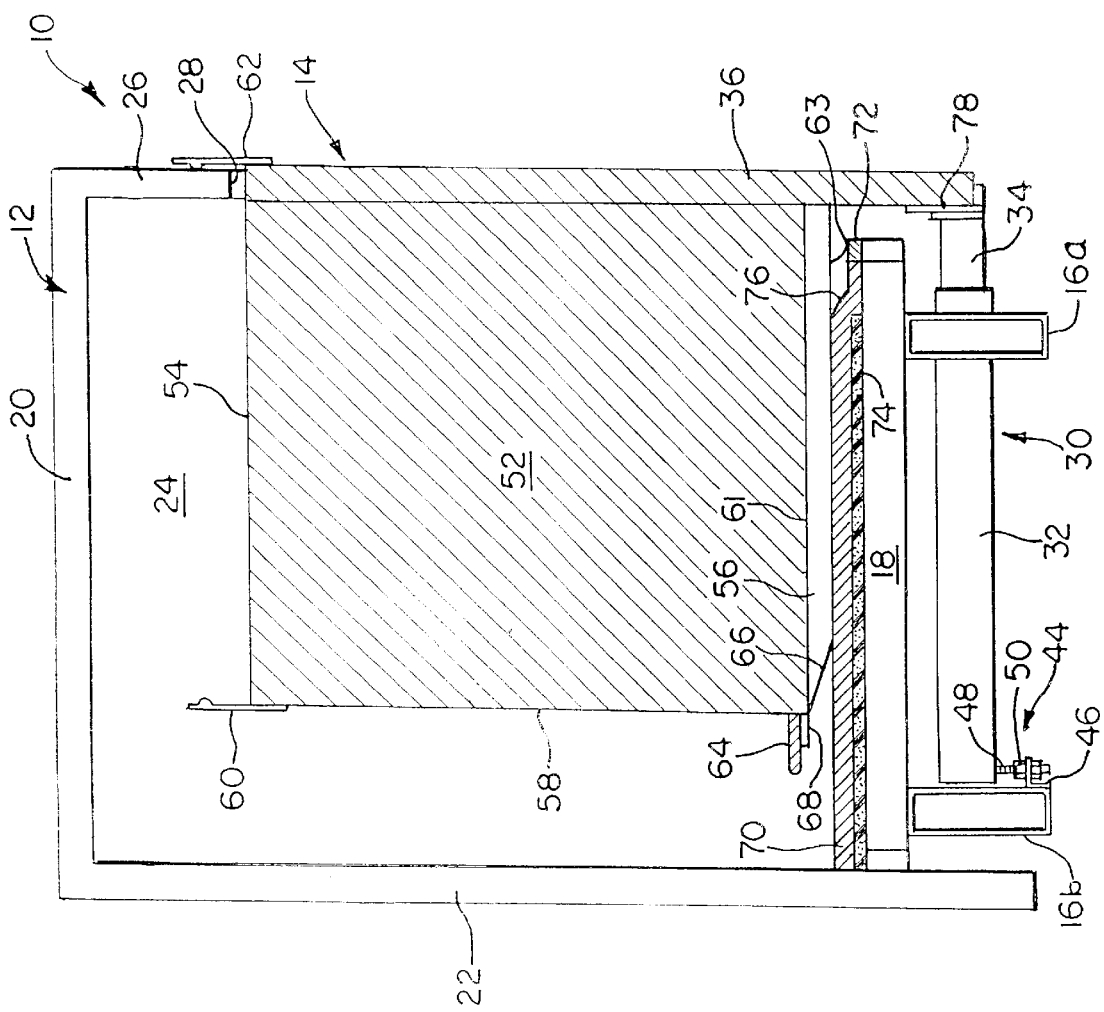
FIG. 1 is a transverse cross sectional view of a mobile living quarters incorporating a slide out room made pursuant to the teachings of the present invention; the slide out room being shown in the retracted position retracted into the main living quarters.

FIGS. 17 and 18 are detailed views of a portion of the mechanisms illustrated in FIGS. 15 and 16 respectively; and FIGS. 19 and 20 are views similar to FIGS. 11 and 12, but illustrating still another embodiment of the invention.

Referring now to the drawings, mobile living quarters generally indicated by the numeral 10 includes a main living area generally indicated by the numeral 12 and an auxiliary living area or slide out room generally indicated by the numeral 14. A pair of conventional, longitudinally extending frame members 16a, 16b support the floor 18 of the main living quarters 12. Main living quarters 12 further include a ceiling 20, a side wall 22, a pair of end walls (only one of which being shown at 24), and a side wall 26 opposite the side wall 22, a portion of which is cut away to define an opening 28 through which the slide out room 14 extends and retracts. The frame members 16a, 16b conventionally are supported by a wheel and axle assembly (not shown) to permit the mobile living quarters 10 to be moved. One or more extendible tubular members generally indicated by the numeral 30 are mounted between frame members 16a, 16b. The extendible member 30 includes an outer tubular member 32 which slidably receives an inner tubular member 34, which includes an end 35 which is rigidly secured to the lower portion of outer wall 36 of the slide out room 14.

Figure 5:
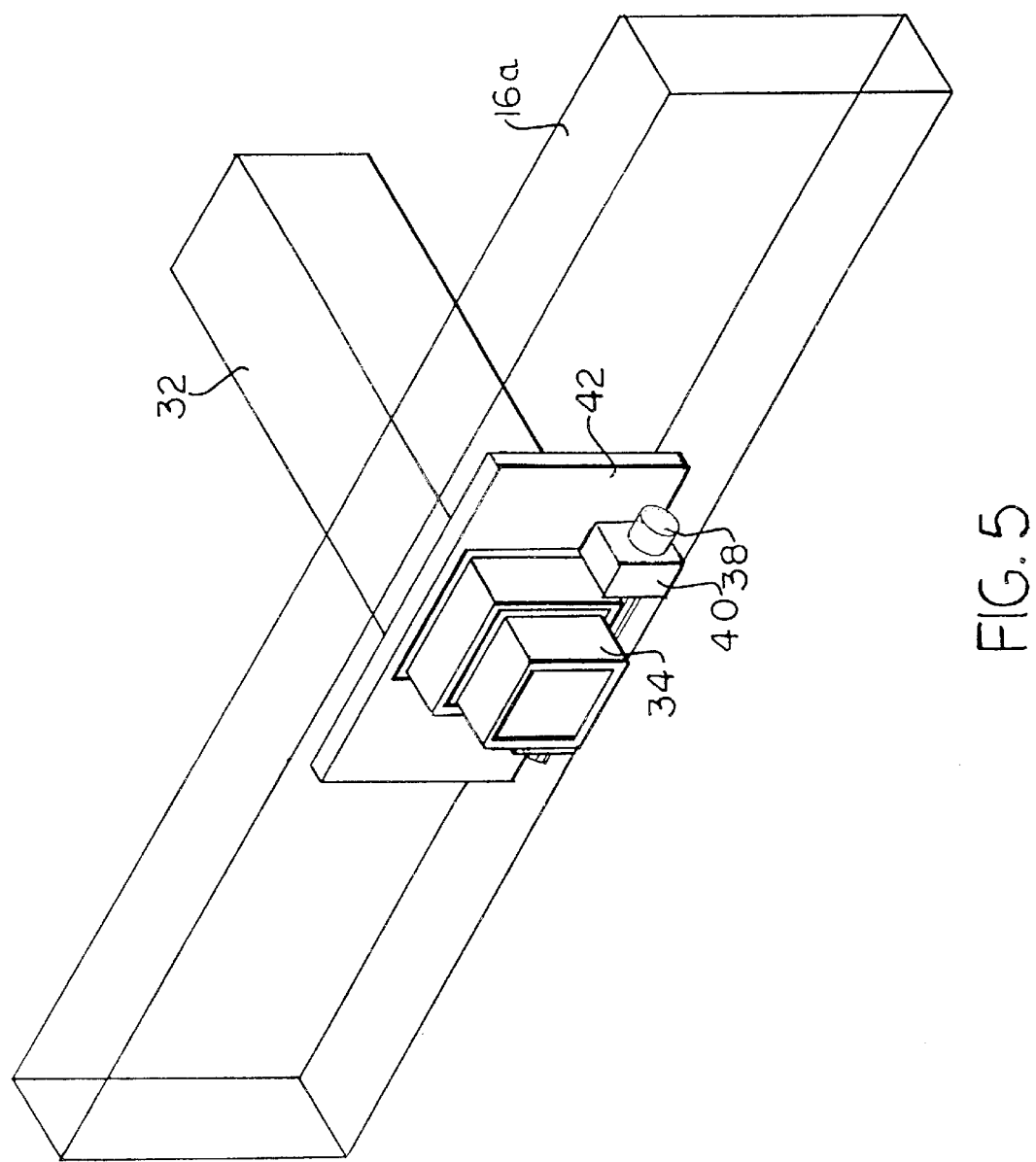
FIG. 5 is view in perspective of the pivot connection between the extendible members supporting the slide out room and the elongated frame members of the main living quarters.
Figure 6:
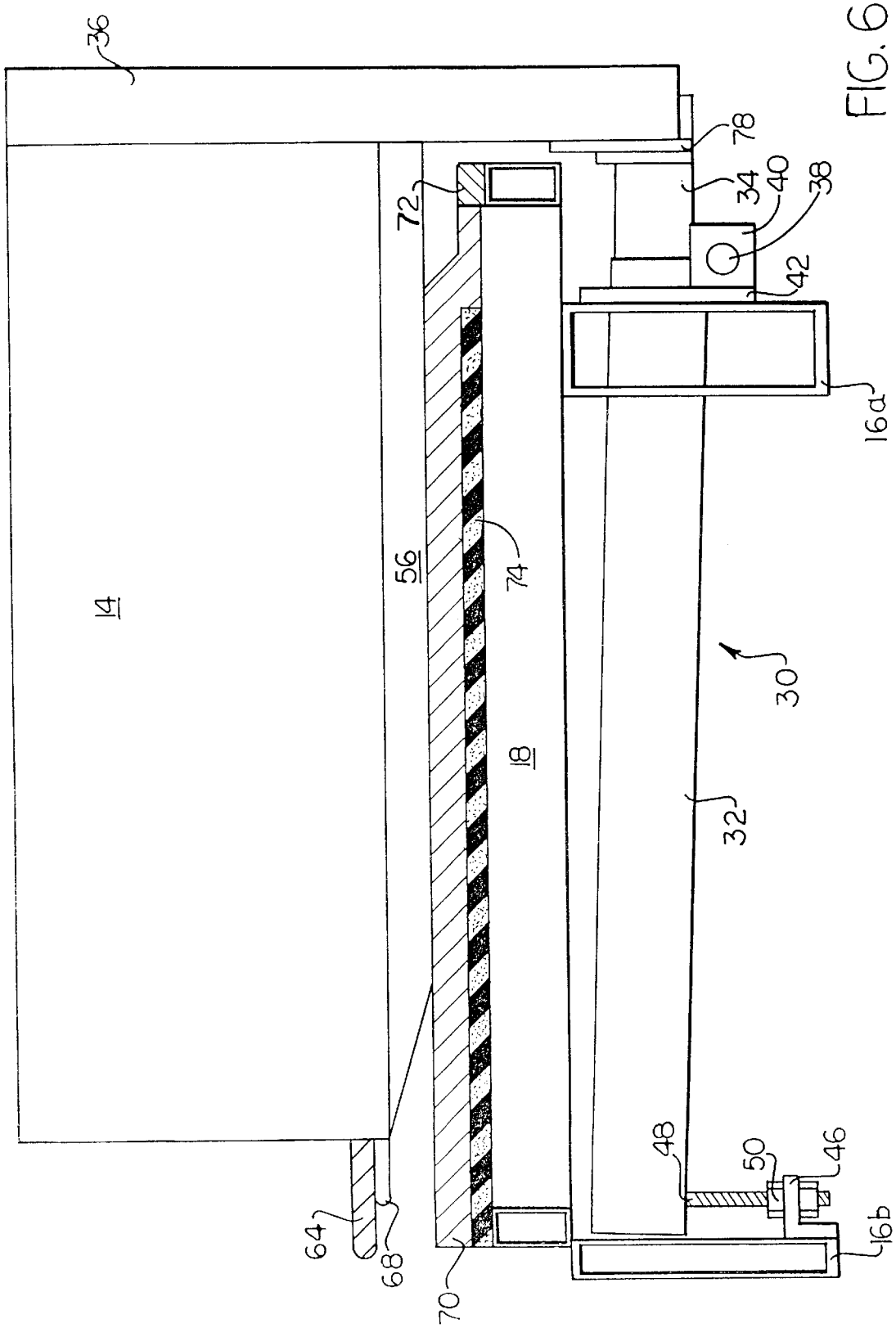
FIG. 6 is an enlarged, detailed view of another embodiment of the present invention illustrating the slide out room and a portion of the floor and the supporting structure of the main living quarters in cross section.

Referring now to FIG. 5, the extendible member 30 extends through the frame member 16a and is secured thereto via a pivot pin 38 which is welded or similarly affixed to the outer member 32 and which is pivotally received in a pair of ears 40 which are rigidly secured to a reinforcing plate 42 which is welded or otherwise affixed to the frame member 16a. The opening in the reenforcing plate 42 and in the frame member 16a is sufficiently larger than the outer member 32 to permit limited pivotal movement of the latter with respect to the longitudinal frame member 16a. Pivoting of the extendible member 30 relative to the frame member 16a as discussed above is controlled by a height adjusting mechanism generally indicated by the numeral 44. Mechanism 44 includes a bracket 46 secured to the frame member 16b and a threaded member 48 which can be adjusted upwardly and downwardly by its threaded connection with nut 50 secured to the bracket 46. The end of the threaded member 48 engages the outer member 32, to pivotally adjust the latter relative to the frame member 16a. The inner member 34 is received within the outer member 32 with a small clearance, but which nonetheless allows limited pivotal movement of the inner member 34 with respect to the outer member 32 as will hereinafter be described.

In addition to the front wall 36, the slide out room 14 includes a pair of end walls (only one of them being shown as at 52), a ceiling 54, and a floor 56. The ends walls 52, the ceiling 54, and the floor 56 define an opening 58 which is open to the main living quarters and provides access to the auxiliary living space provided by the slide out room 14. Sealing members 60, 62 extend outwardly from the ceiling 54 and end walls 52 to engage the portions of the wall 26 circumscribing the aperture 28 to thereby provide sealing of the slide out room 14 with respect to the main living quarters 12 when the slide out room is in the fully retracted and in the fully extend position. Floor 56 of the slide out room 14 includes an upper surface 61 and a lower surface 63. Carpeting 64 is secured to the upper surface 61. A ramp 66 slopes downwardly from a point adjacent the end of the end wall 52 defining the opening 58 at a predetermined angle and intersects the lower surface 63. An outwardly extending tab portion 68 of floor 61 extends outwardly from the opening 58 and a portion of the carpet 64 extends beyond the tab 68. When the slide out room 14 is fully retracted as in FIG. 1, the lower surface 63 rests on carpeting 70 which covers the floor 18 of the main living quarters 12. A wear bar 72 extends longitudinally along the edge of the floor 18 defining the opening 28. Padding 74 is disposed between the carpeting 70 and the floor 18, but the padding 74 is cut short of the wear bar 72 so that the carpeting slopes downwardly as at 76 adjacent the wear bar 72.

As is well known to those skilled in the art, a cantilevered beam, which is represented by the inner member 34 as the slide out room is moved to the fully extended position, deflects or bends as a function of the weight applied to the beam, the distance from the weight to the point at which the beam is supported, the thickness of the beam, and the type of material from which the beam is made. In FIG. 1, with the room in the fully retracted position, almost all of the weight of the room is borne through the floor 18 and a relatively small part of the weight of the room is borne through the inner member 34. According, the inner member 34 does not bend by any noticeable amount.

Figure 2:
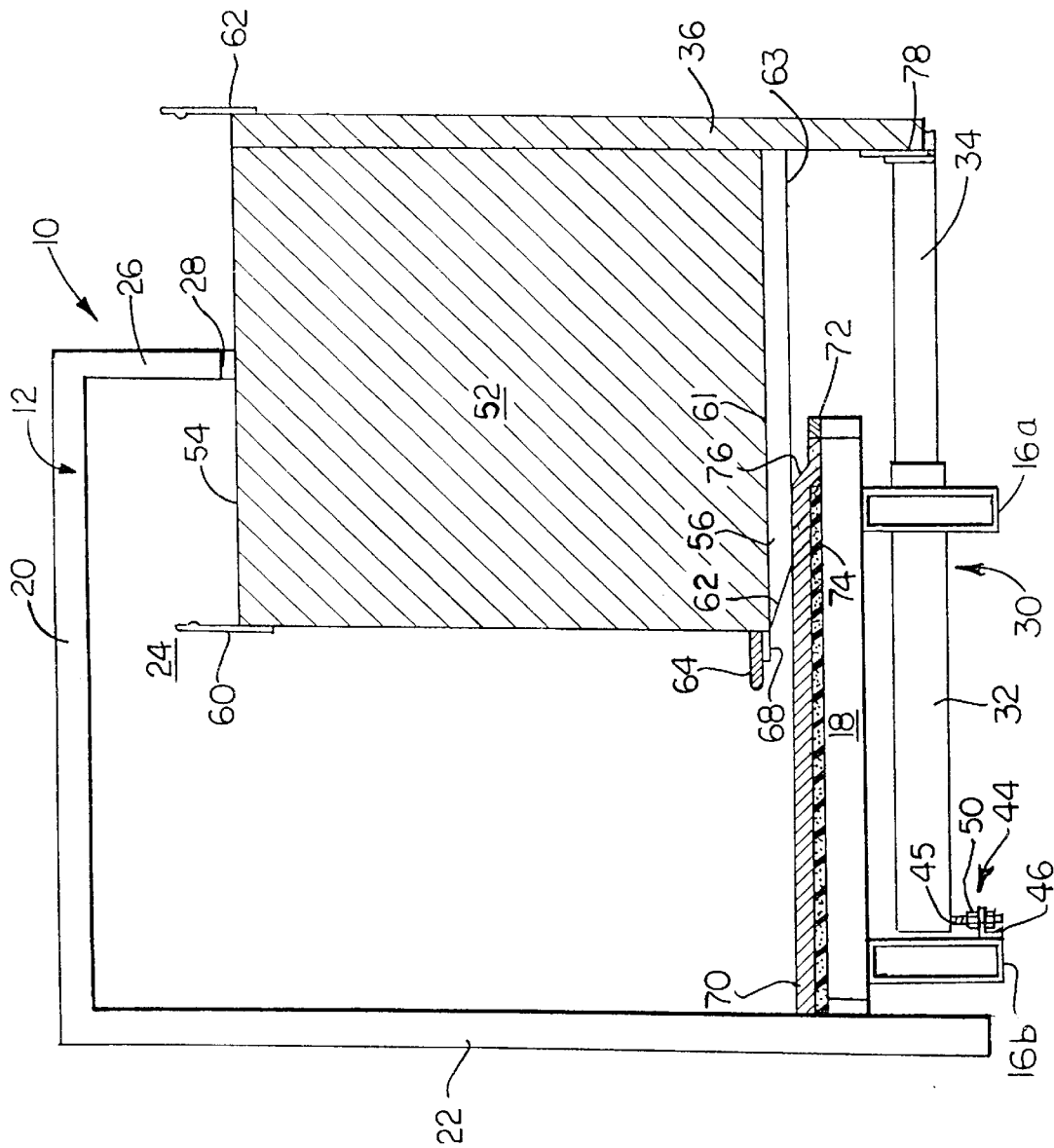
FIG. 2 is a view similar to FIG. 1, but illustrating the slide out room in an intermediate position between the fully retracted and the fully extended position.
Figure 3:
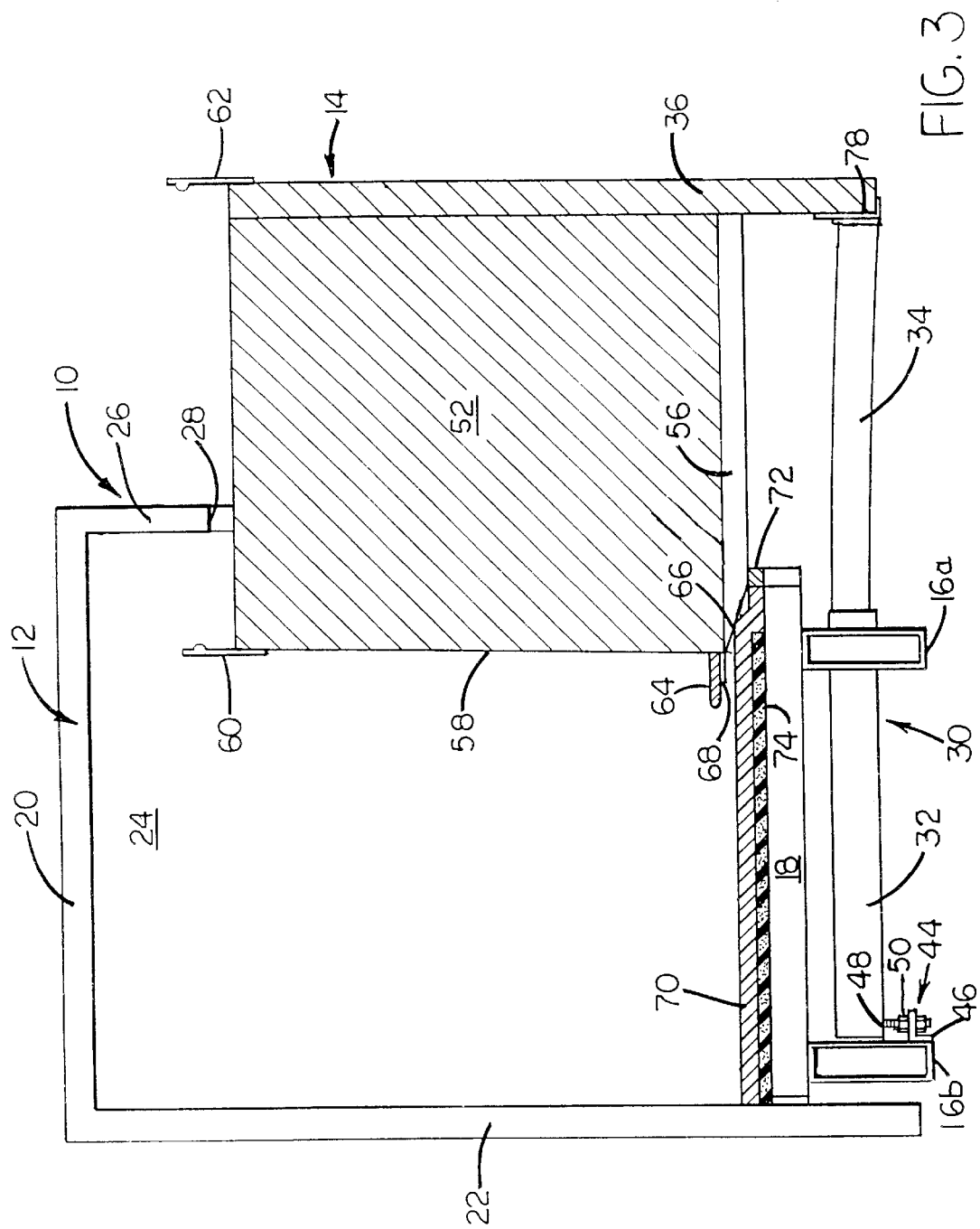
FIG. 3 is a view similar to FIG. 2, but illustrating the slide out room approaching the fully extended position.

Referring to FIG. 2, the slide out room 14 has been extended an appreciable amount, but the floor 56 still rests upon the floor 18. Although a substantial percentage of the weight has been transferred to the inner member 34, a substantial portion is still borne through the floor 18. Accordingly, the inner member 34 deflects only slightly, since the weight applied to inner member 34 and the length of the member 34 from its support is such that the deflection is minimized. However, in FIG. 3, the end of the ramp 66 has reached the wear bar 72. Accordingly, a relatively high percentage of the weight of the room is now borne through the inner member 34, and the inner member 34 has been further extended from its support, so that the bending or deflection is now substantial. It will be noted that the bending has increased substantially between the FIG. 2 and the FIG. 3 positions just as the ramp 66 has moved down the sloped surface 76. The added bending of the inner member 34 during movement of the room between the FIG. 2 and the FIG. 3 position substantially matches the difference in height of the floor the room as the ramp 66 passes along the sloped surface 76. Accordingly, the floor remains level despite the vertical movement of the room. This occurs because the wall thickness and material of the inner member 34 has been chosen to permit a deflection that is substantially equal to this vertical movement of the slide out room.

Figure 4:
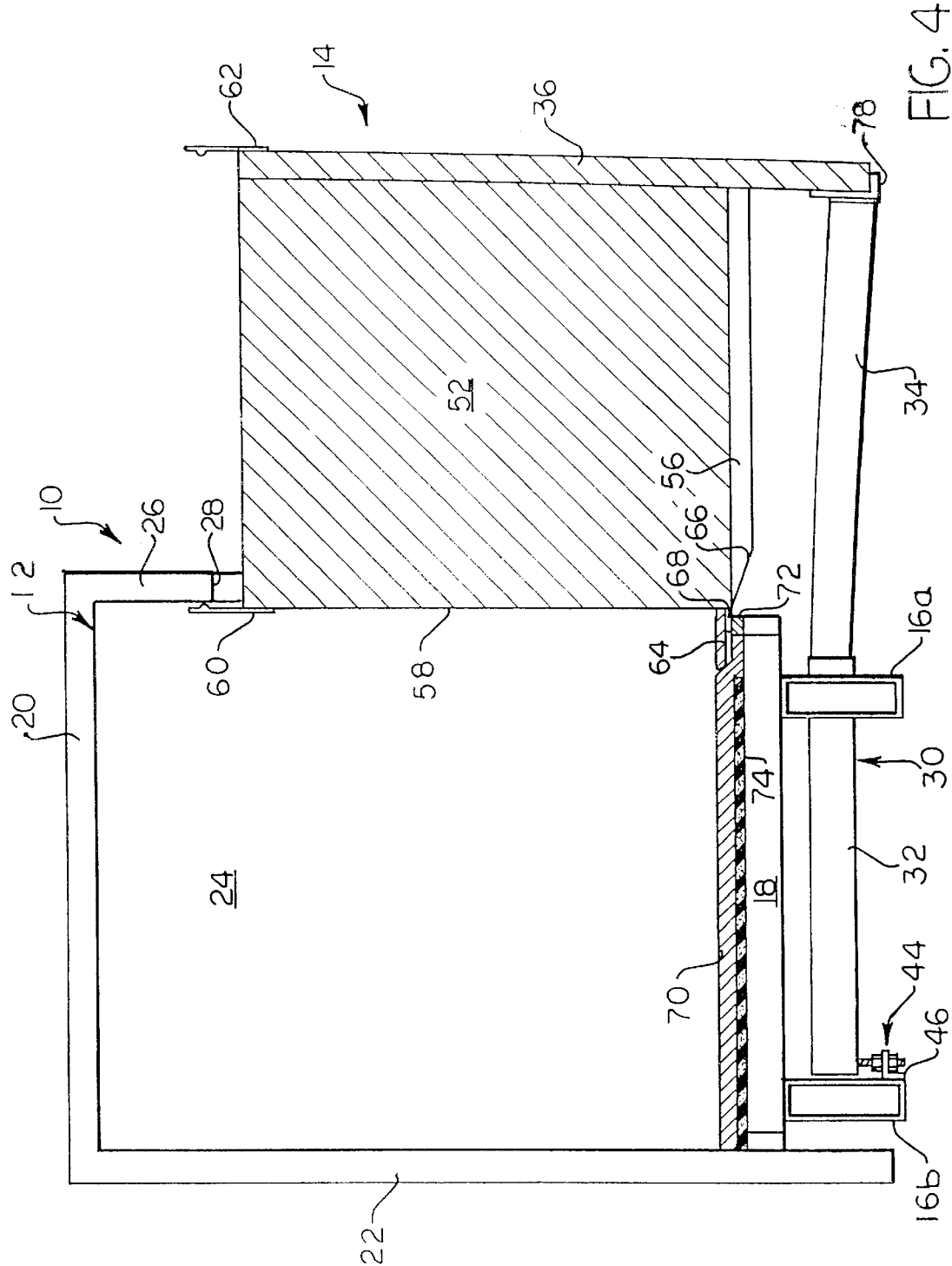
FIG. 4 is a view similar to FIGS. 1–3, but illustrating the slide out room in the fully extended position.

Referring to FIG. 4, the ramp 66 has now moved over the wear bar 72 and the room is now in its fully extended position in which the level of the floor room is now substantially equal to that of the floor 18. The inner member 34 bends further as the slide out room moves so that the floor 56 of the slide out room 14 remains level. Height adjuster 44 can be operated to adjust the end of the member 34 which is attached to the wall 36 by connecting mechanism 78 so that the floor 56 will be level when the slide out room is fully extended. Since a small adjustment of the height adjuster 44 is all that will be necessary to level the floor 60, the welds connecting the outer member 32 with the frame member 16a may be sufficiently flexible to allow this adjustment to be made without the pivot connection provided by the pin 38.

Figure 7:
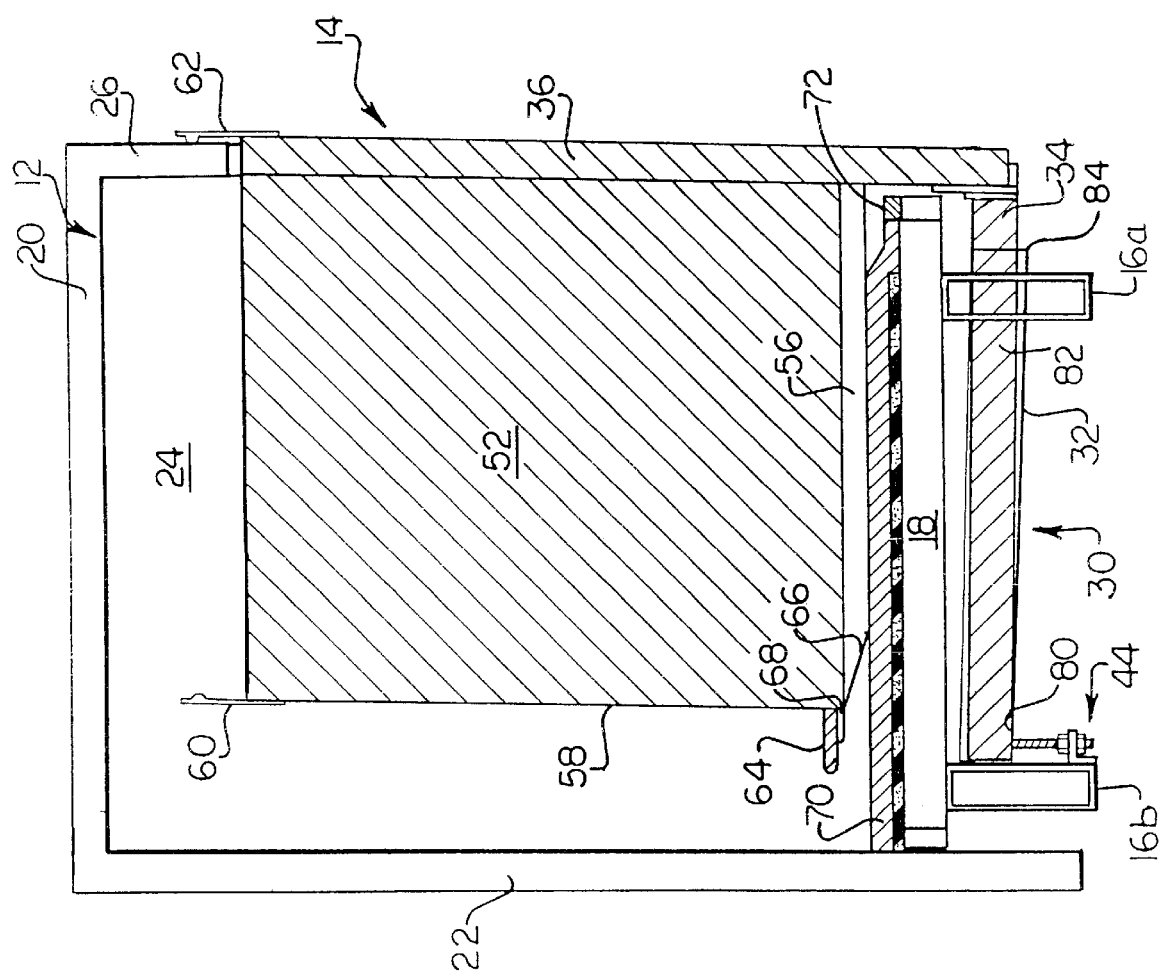
FIG. 7 is a view similar to FIG. 1, but illustrating the embodiment of the invention disclosed in FIG. 6.
Figure 8:
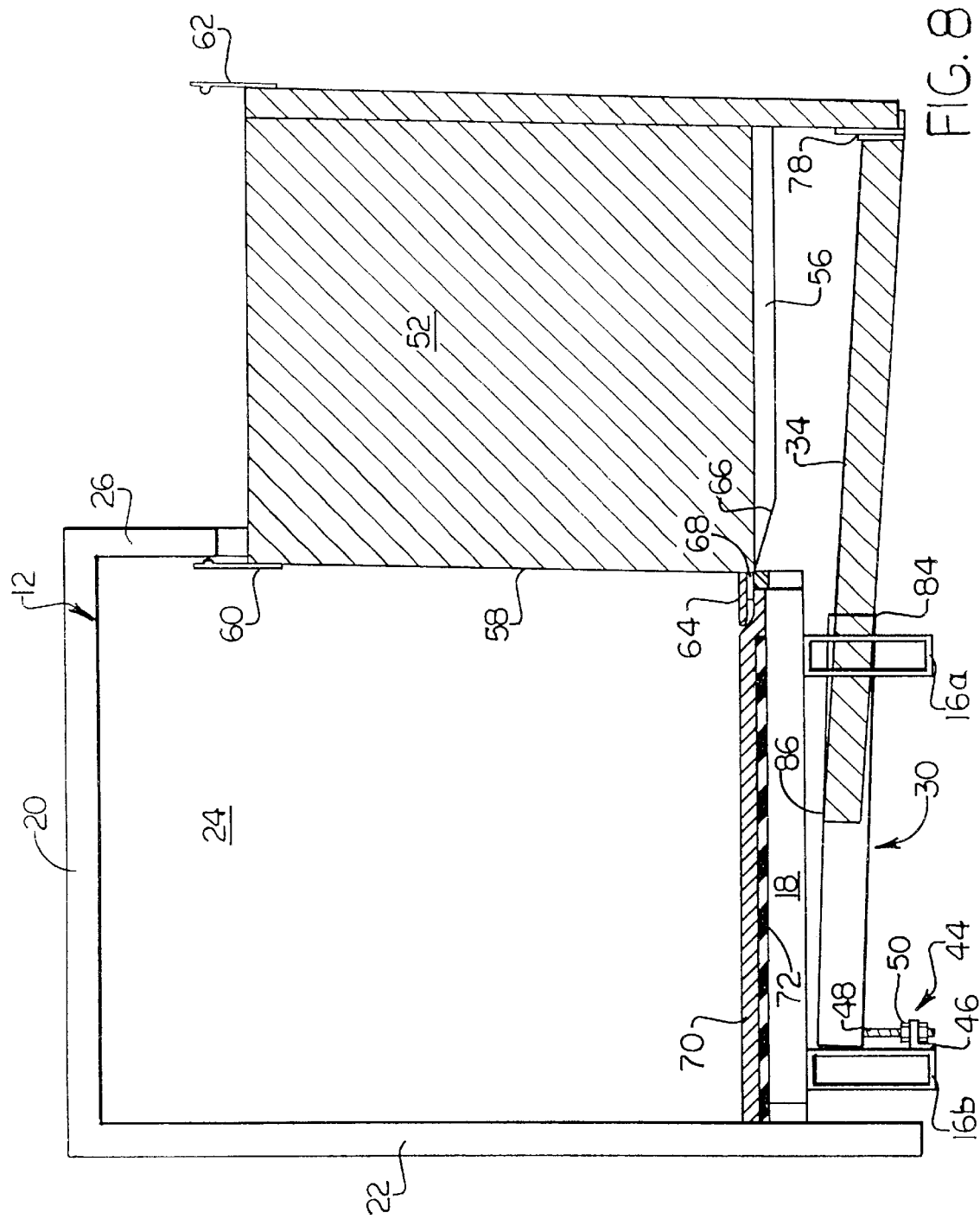
FIG. 8 is a view similar to FIG. 7 but illustrating the slide out room in the fully extended position.

Referring now to the embodiments of FIGS. 7 and 8, the deflection of the inner member 34 as the room 14 extends may be controlled by use of the height adjuster 44 to adjust the angle of the extendible member 30 about the pivot connection between the extendible member and the frame member 16a to either supplement or replace bending of the inner member 34 as a mechanism for maintaining the floor 56 of the room 14 level. As illustrated in FIG. 7, inner member 34 moves within outer member 32 with a working clearance. In FIG. 7, in which the room 14 is fully retracted, the lower edge of the inner member 34 bears against the lower edge of the outer member 32 at a point 80 adjacent the height adjuster 44, and the upper surface of the inner member 34 bears against the upper surface at a point 82 adjacent the outer end 84 of the outer member 32. However, as the slide out room extends, the weight of the room will be transferred from the floor 18 to the member 34 as described above, thereby forcing the member 34 downwardly so that the lower edge of the inner member 34 as brought to engagement with the lower edge of the outer member 32 at the end 84 and that the upper edge of the inner member 34 will contact the upper edge of the outer member 32 at a point 86. This shift in the inner member 34 through the clearance supplements the slope of the extendible member 32 is adjusted by the mechanism 44 such that the slope of extendible member 32 and any deflection of the inner member 34 achieves leveling of the floor 56 substantially flush with the floor 18. As the room 14 is extended and retracted, the shift of the inner member 34 through the clearance between the FIG. 7 and FIG. 8 positions also provides an accommodation to prevent any binding of the inner member 34 in the outer member 32 as it is extended and retracted.

Figure 9:
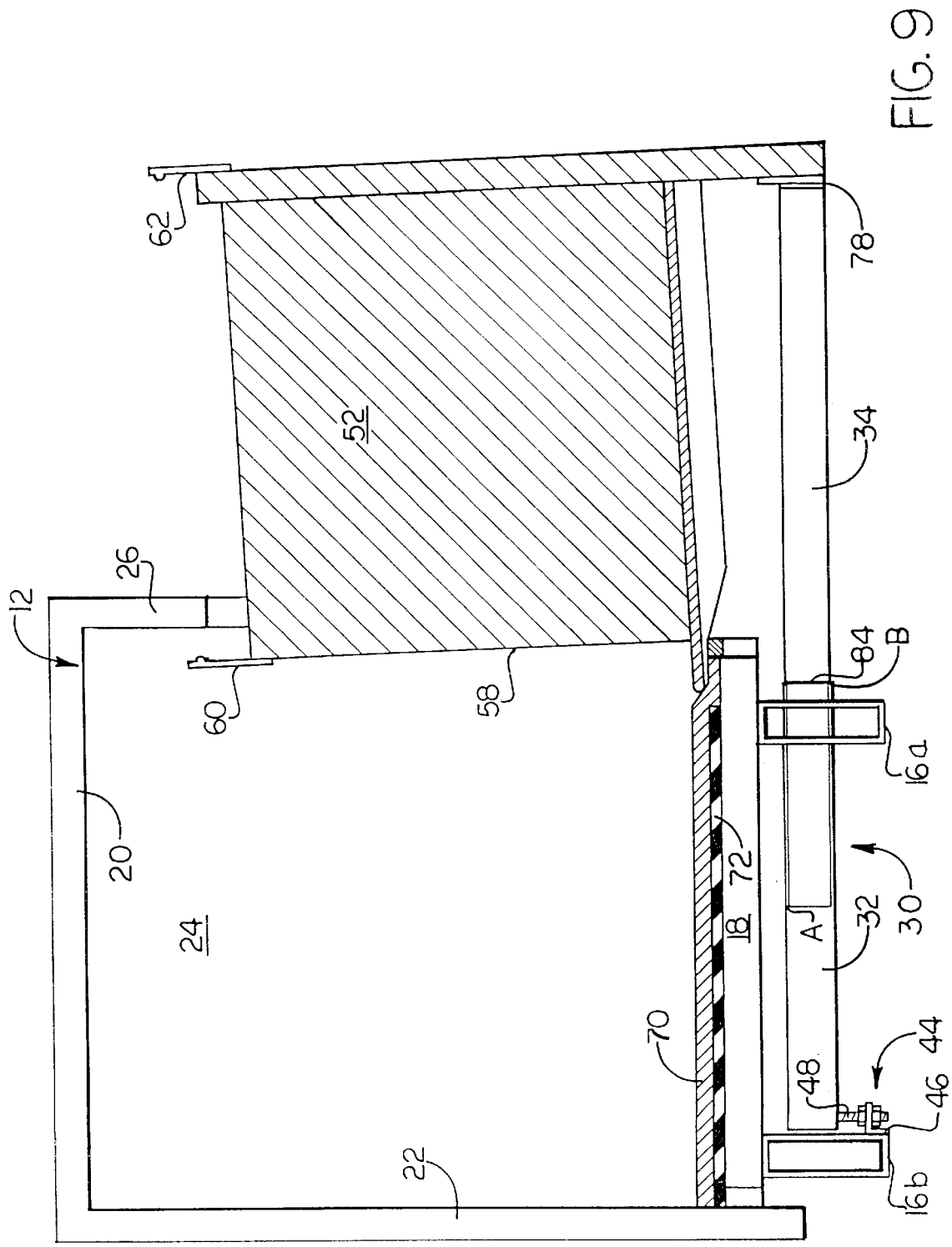
FIG. 9 is a view similar to FIG. 8, but illustrating another embodiment of the invention, and illustrating the position of the slide-out room before leveling adjustments are made.
Figure 10:
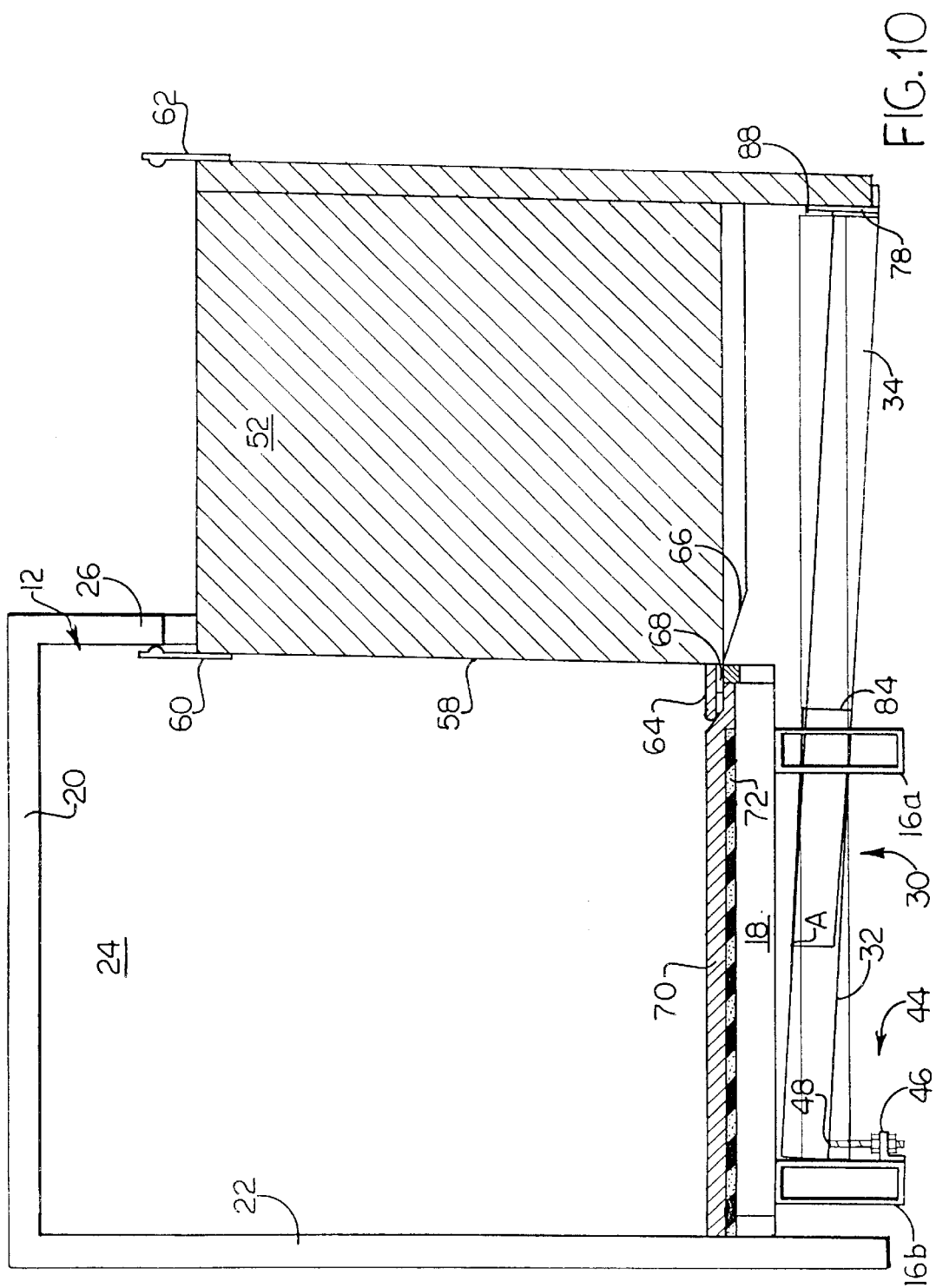
FIG. 10 is a view similar to FIG. 9, but illustrating the position of the slide out room after the leveling adjustment has been made.

Referring now to the embodiment of FIGS. 9 and 10, the outer tubular member 32 is rigidly secured to the main frame member 16a as by welding and is adjusted to adjust the final position of the slide out room by use of the adjustment mechanism 44. Referring to FIG. 9, the slide out room is in the fully extended position, and the inner member 34 bears on the upper surface of outer tubular member 32 at engagement point A and at the lower surface of tubular member 32 and engagement point B at end 84 of the outer tubular member 32.

However, the floor of the slide out room is not level with the main floor. Referring to FIG. 10, the position of the tubular members 32, 34 in FIG. 9 is illustrated in phantom. In FIG. 10, the adjustment mechanism 44 has been operated to raise the end of the outer tubular member 32 adjacent the main frame member 16b. Since, as discussed above, the outer tubular member 32 is rigidly secured to the main frame member 16a, raising the end of the tubular member 32 by operation of the adjustment mechanism 44 bends the outer tubular member 32 from the phantom line position to the solid line position in FIG. 10. Accordingly, engagement point A in FIG. 9 has been raised slightly to engagement point A' in FIG. 10. Accordingly, the outer end 88, is lowered from the phantom line position to the solid line position, thus leveling the slide out room. Of course, the inner tubular member 34 can also be designed to deflect so that, optionally, the slide out room 52 may be leveled both by deflection of the inner tubular member 34 and by bending of the outer tubular member 32 by operation of the adjustment mechanism 48. Preferably, outer tubular member 32 includes a longitudinally extending slot (not shown) which runs the entire length of the tubular member but on only one side surface thereof. The slot facilitates bending of the outer tubular member 32 as illustrated in FIG. 10.

The embodiments of FIGS. 11–20 are similar to the other embodiments of the invention, but in the embodiments of FIGS. 11–20 the adjustment feature 44 is eliminated, and the outer member 32 is rigidly secured, such as by welding, to the main frame member 16b, as well as being similarly secured to the main frame member 16a. In each of FIGS. 11–16 and 19 and 20, the main frame members 16a, 16b are illustrated as being attached to an axle 90, via appropriate suspension systems 92. Conventional wheels 94 are mounted on opposite sides of the axle 90. The embodiment of FIGS. 11 and 12 is the same as the embodiment of FIGS. 14, and the embodiment of FIGS. 13–14 is the same as the embodiment of FIG. 7–10, except in both cases the outer tubular member 32 is welded to the main frame member 16b, thereby eliminating the adjustment mechanism 44. In the case of FIGS. 11 and 12, deflection of the inner tubular member 34 as is moves into the extended position illustrated in FIG. 12 is such that the slide out room floor (not shown) moves in a position flush with the main floor 18. Outer tubular member 32 in the embodiment of FIGS. 11–12 is secured to the main frame member 16a, 16b in a substantially horizontal position. The rigidity of the inner tubular member 34 is a factor of the material, wall thickness, etc. as discussed above. Similarly, in the embodiment of FIGS. 13 and 14, outer tubular member 32 is welded, or otherwise rigidly secured, to the main frame member 16a, 16b in a substantially horizontal position. Accordingly, as the slide out room (not shown in FIGS. 13 and 14) moves into the fully extended position, inner tubular member 34 deflects through the clearance between the tubular members 32, 34 (which is exaggerated in FIG. 13 and 14) to the downward position illustrated in FIG. 14, in which the slide out room floor moves into a position flush with the main floor 18. The clearance between the tubular members 32, 34 is chosen for the proper deflection to bring the slide out room floor flush with the main floor even though the outer tubular member is rigidly secured to the main frame members 16a, 16b in a substantially horizontal position.

The embodiment of FIGS. 15–18 is similar to the embodiments of FIGS. 13 and 14, except that the inner tubular member 34 is provided with a roller 96 adjacent the end 98 thereof received within outer tubular member 32. The roller 96 is mounted on a shaft 100 which is allowed to move vertically relative to the inner tubular member 34. A spring 102 yieldably urges the roller 96 upwardly viewing FIG. 17 and 18 into rolling engagement of upper surface 104 of outer tubular member 32. As can be seen in FIGS. 17 and 18, when the slide out room is in the fully retracted position, the inner tubular member 34 rests upon a lower surface 106 of outer tubular member 32. Accordingly, the roller 96 guides the inner tubular member 34 as it moves outwardly with the slide out room as the slide out room is moved toward the extended position. When the aforementioned weight transfer occurs and the inner tubular member 34 deflects into the FIG. 18 position, the spring 102 yields to allow the roller 96 to withdraw into the inner tubular member 34, as illustrated in FIG. 18. As discussed above, when the inner tubular member deflects into the FIG. 18 position as the slide out room moves into the fully extended position, the deflection of the inner tubular member 34 lowers outer end 108 thereof (which is secured to the slide out room) sufficiently to bring the slide out room floor into a position substantially flush with the main floor 18.

In the embodiment of FIGS. 19 and 20, the outer tubular member 32 is rigidly secured, as by welding, to the main frame members 16a and 16b. However, the connection point 108, at which the outer tubular member 32 is secured to main frame member 16a is offset vertically below the connection point 110, at which the outer tubular member 32 is secured to the main frame member 16b. Accordingly, the extendible member 30 extends between the main frame members 16b, 16a at an oblique angle with respect to the horizontal. The oblique angle is chosen such that the end 107 of the extendible inner tubular member 34 is displaced sufficiently as the inner tubular member extends with the slide out room to permit the slide out room 34 to be level with the main floor 18. In addition to the oblique angle, the extendible member 30 may be designed so that the deflection of the inner tubular member 34, as is the case in FIGS. 11 and 12, supplements the angularity of the extendible member 30 to bring the slide out room floor flush or substantially flush with the main floor 18. Furthermore, the inner tubular member 34 and outer tubular member 32 may be designed such that movement of the inner member 34 through the clearance between the inner and outer tubular members, as in the case of the embodiments of FIGS. 13–18, supplements the angularity of the extendible member 30 to permit the slide out room floor to become flush with the main floor 18. In fact, a combination of the angularity of the extendible member 13, bending of the inner tubular member 34, and deflection of the inner tubular member 34 may all be combined if necessary.

What is claimed is:

1. Transportable living quarters having a pair of longitudinally extending main frame members supporting structure defining a main living area and a slide out room assembly slidable relative to said structure between a retracted position retracted within the main living area and an extended position extended from the main living area to provide an auxiliary living area, said structure including a main floor supported by said frame, said slide out room including a slide out room floor movable from a raised position sliding over said main floor as said slide out room slides between the extended and retracted positions to a lowered position substantially flush with the main floor as the slide out room moves into the extended position and movable from the lowered to the raised position as the slide out room is moved from the extended position, an outer tubular member attached to one of said main frame members against movement relative to said one main frame member at a first connection point, said first connection point being adjacent one end of said outer tubular member, said outer tubular member also being attached to the other main frame member against movement relative to said other main frame member at a second connection point, an inner tubular member having one end slidably received within the outer tubular member and an opposite end secured to said slide out room, said frame, said inner tubular member, and said outer tubular member cooperating to drop said opposite end of the inner tubular member vertically as the slide out room moves from the retracted position to the extended position a distance sufficient to drop the slide out room floor from the raised to the lowered position, said first connection point being offset vertically below the second connection point whereby the outer tubular member extends between the main frame members at an oblique anile with respect thereto.

2. Transportable living quarters as claimed in claim 1, wherein said oblique angle is chosen to permit the slide out room floor to move between the raised and lowered positions as said inner tubular member extends from the outer tubular member.

3. Transportable living quarters as claimed in claim 1, wherein said inner tubular member deflects by bending relative to the outer tubular member in response to transfer of the weight of the slide out room from said main floor to said inner tubular member as said slide out room is moved toward said extended position.

4. Transportable living quarters as claimed in claim 2, wherein said inner tubular member is received with clearance within the outer tubular member, said outer tubular member having upper and lower surfaces, said inner tubular member deflecting relative to the outer tubular member by moving through said clearance in response to weight transfer as said slide out room moves toward the extended position such that the inner tubular member moves relative to the outer tubular member to engage said upper surface.

5. Transportable living quarters as claimed in claim 4, wherein a roller is rotatably mounted on a portion of said inner member received within said outer member, said roller being rollable along said upper surface as said slide out room is moved between the retracted and extended positions.

6. Transportable living quarters as claimed in claim 5, wherein said roller is mounted on said inner member via a deflectable connection, said roller being deflectable relative to said inner member as said inner member moves toward said upper surface.

7. Transportable living quarters having a pair of longitudinally extending main frame members supporting structure defining a main living area and a slide out room assembly slidable relative to said structure between a retracted position retracted within the main living area and an extended position extended from the main living area to provide an auxiliary living area, said structure including a main floor supported by said frame, said slide out room including a slide out room floor movable from a raised position sliding over said main floor as said slide out room slides between the extended and retracted positions to a lowered position substantially flush with the main floor as the slide out room moves into the extended position and movable from the lowered to the raised position as the slide out room is moved from the extended position, an outer tubular member rigidly secured to one of said main frame members against movement relative to said one main frame member at a first connection point, said first connection point being adjacent one end of said outer tubular member, said outer tubular member also being rigidly secured to the other main frame member against movement relative to said other main frame member at a second connection point, an inner tubular member having one end slidably received within the outer tubular member and an opposite end secured to said slide out room, said inner tubular member being received with clearance within the outer tubular member, said outer tubular member having upper and lower surfaces, said inner tubular member deflecting relative to the outer tubular member by moving through said clearance in response to weight transfer as said slide out room moves toward the extended position such that the inner tubular member moves relative to the outer tubular member to engage said upper surface.

8. Transportable living quarters as claimed in claim 7, wherein a roller is rotatably mounted on a portion of said inner member received within said outer member, said roller being rollable along said upper surface as said slide out room is moved between the retracted and extended positions.

9. Transportable living quarters as claimed in claim 8, wherein said roller is mounted on said inner member via a deflectable connection, said roller being deflectable relative to said inner member as said inner member moves toward said upper surface.

10. Transportable living quarters having a pair of longitudinally extending main frame members supporting structure defining a main living area and a slide out room assembly slidable relative to said structure between a retracted position retracted within the main living area and an extended position extended from the main living area to provide an auxiliary living area, said structure including a main floor supported by said frame, said slide out room including a slide out room floor movable from a raised position sliding over said main floor as said slide out room slides between the extended and retracted positions to a lowered position substantially flush with the main floor as the slide out room moves into the extended position and movable from the lowered to the raised position as the slide out room is moved from the extended position, an outer tubular member attached to one of said main frame members against movement relative to said one main frame member at a first connection point, said first connection point being adjacent one end of said outer tubular member, said outer tubular member also being attached to the other main frame member against movement relative to said other main frame member at a second connection point, an inner tubular member having one end slidably received within the outer tubular member and an opposite end secured to said slide out room, said first connection point being offset vertically below the second connection point whereby said outer tubular member extends between the main frame members at an oblique angle with respect thereto.

11. A slide out room to provide an auxiliary living area for transportable living quarters having a main living area partially defined by a main floor supported by longitudinal frame members, the room including a floor, an outer support member having a first connection point attached to one of the frame members and a second connection point attached to another frame member, and an inner support member being movably received by the outer member and having an end secured to the room, the room being movable between a retracted position within the main living area wherein the room floor is in a raised position over the main floor, and an extended position extending from the main living area wherein the room floor is in a lowered position substantially flush with the main floor, the first connection point being offset vertically below the second connection point such that the outer member extends between the frame members at an angle relative to horizontal.

12. A slide out room as claimed in claim 11 wherein the second connection point is adjustably attached to the other frame member such that the second connection point is adjustable vertically.

13. A slide out room as claimed in claim 11 wherein the angle is chosen to permit the room floor to move between the raised and lowered positions as the inner member extends from the outer member.

14. A slide out room as claimed in claim 11 wherein the inner member is adapted to deflect by bending relative to the outer member in response to a transfer of weight of the room from the main floor to the inner member as the room is moved toward the extended position.

15. A slide out room as claimed in claim 11 wherein the inner member is received with clearance within the outer member, the outer member having upper and lower surfaces, the inner member being adapted to deflect relative to the outer member by moving through the clearance in response to weight transfer as the room moves toward the extended position such that the inner member moves relative to the outer member to engage the upper surface.

16. A slide out room as claimed in claim 15 wherein a roller is rotatably mounted on a portion of the inner member received within the outer member, the roller being rollable along the upper surface as the room is moved between the retracted and the extended positions.

17. A slide out room as claimed in claim 16 wherein the roller is mounted on the inner member via a deflectable connection, the roller being adapted to deflect relative to the inner member as the inner member moves toward the upper surface.

18. A slide out room to provide an auxiliary living area for transportable living quarters having a main living area partially defined by a main floor supported by a main frame, the room including a floor and an extendable support member mounted on the main frame and connected to the room, the room being movable between a retracted position within the main living area wherein the room floor is in a raised position over the main floor, and an extended position extending from the main living area wherein the room floor is in a lowered position vertically displaced relative to the raised position and substantially flush with the main floor, the weight of the room being transferable from the main floor to the extendable member as the room is moved toward the extended position, the extendable member being adapted to deflect in response to the weight transfer by a predetermined amount being substantially equal to the vertical displacement of the room floor to permit the room floor to move to the lowered position.

19. A slide out room as claimed in claim 18 wherein the extendable support member includes an outer member adjustably mounted on the main frame such that one end of the outer member may be raised and lowered relative to the other end of the outer member.

20. A slide out room as claimed in claim 18 wherein the extendable support member is mounted on the main frame at an angle relative to horizontal.

21. A slide out room as claimed in claim 18 wherein the extendable support member includes an outer member mounted to the main frame and an inner member received by the outer member and connected to the room, the outer member having a first end connected to the main frame at a first location and a second end connected to the main frame at a second location, the first location being offset vertically below the second location.

22. A slide out room as claimed in claim 18 wherein the extendable support member includes an outer member connected to the main frame and an inner member received with clearance within the outer member, the outer member having upper and lower surfaces, the inner member being adapted to deflect relative to the outer member by moving through the clearance in response to weight transfer as the room moves toward the extended position such that the inner member moves relative to the outer member to engage the upper surface.

23. A slide out room as claimed in claim 22 wherein a roller is rotatably mounted on a portion of the inner member received within the outer member, the roller being rollable along the upper surface as the room is moved between the retracted and extended positions.

24. A slide out room as claimed in claim 23 wherein the roller is mounted on the inner member via a deflectable connection, the roller deflecting relative to the inner member as the inner member moves toward the upper surface.

25. A slide out room to provide an auxiliary living area for transportable living quarters having a main living area partially defined by a main floor supported by a main frame, the room including a floor and an extendable member including an outer support member, and an inner support member movably coupled to the outer member and having an end attached to the room, the room being movable between a retracted position within the main living area wherein the room floor is in a raised position over the main floor, and an extended position extending from the main living area wherein the room floor is in a lowered position vertically displaced relative to the raised position and substantially flush with the main floor, the weight of the room being transferable from the main floor to the extendable member as the room is moved toward the extended position, the outer member being mounted to the main frame such that the inner member end moves downwardly as the room is moved into the extended position, the inner member being adapted to deflect in response to the weight transfer by a predetermined amount which, when combined with the downward movement of the inner member end, is substantially equal to the vertical displacement of the room floor, to permit the room floor to move to the lowered position.

26. A slide out room as claimed in claim 25 wherein the outer member is adjustably connected to the main frame such that an end of the outer member is adjustable vertically relative to another end of the outer member.

27. A slide out room as claimed in claim 25 wherein the outer member is mounted to the main frame at an angle chosen to permit the downward movement of the inner member end as the room is moved into the extended position.

28. A slide out room as claimed in claim 25 wherein the inner member is adapted to deflect by bending relative to the outer member.

29. A slide out room as claimed in claim 25 wherein the inner member is received with clearance within the outer member, the outer member having upper and lower surfaces, the inner member deflecting relative to the outer member by moving through the clearance in response to weight transfer as the room moves toward the extended position such that the inner member moves relative to the outer member to engage the upper surface.

30. A slide out room as claimed in claim 29 wherein a roller is rotatably mounted on a portion of the inner member received within the outer member, the roller being rollable along the upper surface as the room is moved between the extended and retracted positions.

31. A slide out room as claimed in claim 30 wherein the roller is mounted on the inner member via a deflectable connection, the roller deflecting relative to the inner member as the inner member moves toward the upper surface.

* * * * *

UNITED STATES PATENT AND TRADEMARK OFFICE
CERTIFICATE OF CORRECTION

PATENT NO. : 6,176,045 B1
DATED : January 23, 2001
INVENTOR(S) : Patrick W. McManus et al.

It is certified that error appears in the above-identified patent and that said Letters Patent is hereby corrected as shown below:

Claim 1, Line 24, "anile" should be -- angle --

Signed and Sealed this

Fifteenth Day of May, 2001

Attest:

NICHOLAS P. GODICI

Attesting Officer        Acting Director of the United States Patent and Trademark Office